United States Patent [19]

Ishak et al.

[11] Patent Number: 5,475,837
[45] Date of Patent: Dec. 12, 1995

[54] METHOD AND SYSTEM FOR RESTRUCTURING A B-TREE FOR MANAGING DATA DURING A NODE SPLITTING OPERATION

[75] Inventors: Ragaa Ishak; Yijhye J. Hwang, both of Cupertino, Calif.

[73] Assignee: Hewlett-Packard Company, Palo Alto, Calif.

[21] Appl. No.: 373,675

[22] Filed: Jan. 17, 1995

Related U.S. Application Data

[63] Continuation of Ser. No. 706,719, May 29, 1991, Pat. No. 5,430,869.

[51] Int. Cl.[6] .............................. G06F 7/00; G06F 12/06
[52] U.S. Cl. .................. 395/600; 395/650; 395/421.06; 364/DIG. 1; 364/282.1; 364/283.1; 364/222.82
[58] Field of Search .................................... 395/600, 725, 395/500; 364/DIG. 1

[56] References Cited

U.S. PATENT DOCUMENTS

| | | | |
|---|---|---|---|
| 5,089,952 | 2/1992 | Bozman | 395/725 |
| 5,119,490 | 6/1992 | Kurose | 395/600 |
| 5,123,104 | 6/1992 | Levine et al. | 395/600 |
| 5,204,958 | 4/1993 | Cheng et al. | 395/600 |
| 5,261,088 | 11/1993 | Baird et al. | 395/600 |
| 5,265,244 | 11/1993 | Ghosh et al. | 395/600 |
| 5,307,486 | 4/1994 | Nakamigawa | 395/600 |
| 5,430,869 | 7/1995 | Ishak et al. | 395/600 |

*Primary Examiner*—Thomas G. Black
*Assistant Examiner*—Jean R. Homere

[57] ABSTRACT

A database management system and method which permit a B-Tree to be concurrently traversed for the purpose of reading while the B-Tree is actually in the process of restructuring. The present system and method support node splitting for expansion of the B-Tree. The present system and method also support node deletion. A set of update transactions are required to carry out the node-splitting/expansion process. A separate set of steps are required to carry out the node deletion process. The B-Tree can be accessed by readers while either node splitting or deletion occurs, because of the ordering of the process steps. The ordering of the node-splitting and node deletion processes modifies the B-Tree and permit concurrent data readout in an efficient manner. Hence, readers are not required to hold a tree latch or poll for potential in-progress restructuring.

6 Claims, 8 Drawing Sheets

METHOD AND SYSTEM FOR RESTRUCTURING A B-TREE FOR MANAGING DATA DURING A NODE SPLITTING OPERATION

This is a continuation of copending application Ser. No. 07/706,719 filed on May 29, 1991, now U.S. Pat. No. 5,430,869.

BACKGROUND OF THE INVENTION

1. Field of the Invention

The field of the invention relates to the dynamic and concurrent restructuring of $B^+$-Tree storage structures. More generally, the invention relates to a system and method of semantically consistent dynamic restructuring of, and access to, large data bases.

2. Related Art

A concurrent B-Tree system and method can achieve more parallelism than standard concurrency control methods. The literature contains several concurrent search structure algorithms such as: the lock-coupling technique by Bayer, et al., "Concurrency of Operations on B-Trees", Acta Information, Vol. 9, No. 1, p1–21, 1977; the $B^{link}$-Tree storage model by Lehman, et al., "Efficient Locking for Concurrent Operations on B-Trees", ACM Transactions on Database Systems, Vol. 6, No. 4, December 1981; the give-up technique by Shasha, et al., "Concurrent Search Structure Algorithms", ACM Transactions on Database Systems, Vol. 13, No. 1, March 1988; and the ARIES/IM system, see Mohan, et al., "ARIES/IM: An Efficient and High Concurrency Index Management Method Using Write Ahead Logging", IBM Research Report 1989.

Consider the ARIES/IM system. During traversal, a special "SM" bit on each page involved in a structural modification operation (SMO) must be checked. If the SM bit is on, then the traverser requests and holds a tree latch until the SMO has completed. Thus, the ARIES/IM system does not permit fetches to traverse the tree until the structural modification operation is complete.

SUMMARY OF THE INVENTION

The present invention is directed to a database management system and method which permits a B-Tree to be concurrently traversed for the purpose of reading while the B-Tree is actually in the process of restructuring. The present system and method support node splitting for expansion of the B-Tree. A set of update steps are required to carry out the node-splitting/expansion process. However, due to the ordering of these steps, the B-Tree can be accessed by readers while the node-splitting process actually takes place.

The present system and method also support node deletion. As with node splitting, a set of update steps are required to carry out the node deletion process, but, due to the ordering of these steps, the B-Tree can be accessed by readers while node deletion occurs.

Furthermore, the present system and method permit nesting of the restructuring operations. In other words, a node splitting or deletion restructuring operation of the present invention can be initiated prior to the completion of an in-progress node splitting or deletion restructuring operation, respectively. Because of the ordering of the restructuring steps performed by the present system and method, there is no conceptual limit to the number of nested restructuring operations permitted by the present invention.

The ordering of the node splitting and node deletion processes of the present invention modifies the B-Tree and permits concurrent data readout in an efficient manner. Hence, readers are not required to hold a tree latch.

FEATURES AND ADVANTAGES OF THE INVENTION

First, it is important to note that in conventional node splits, the old node is latched in X until a link from the old node to the new node is established. Therefore, during a concurrent traversal, if a key is not found on the old page, then the link is followed to the new page where the key may or may not be found. Consequently, extra pages may be traversed wastefully. This is referred to as "wasted I/O." However, performance of the present Concurrent B-Tree system and method is enhanced because it avoids reading extra pages when traversing or doing a single fetch.

The present Concurrent B-Tree System and method eliminates ambiguity during traversals. The extra processing of making a traverser extra cautious is avoided. There is no need to retraverse the tree during a single fetch in order to find a single key. The saving in processing leads to increased performance. The resulting increased concurrency occurs because readers do not compete for the tree latch.

The present Concurrent B-Tree system and method allocate two new pages during a node split, where the $B^{link}$-Tree and the ARIES/IM allocate only one new page. Using the WAL (Write Ahead Logic) logging scheme, the allocation of two new pages would actually perform better for the following reasons:

The deletion of keys from the old page would require the logging of each deleted key separately, while the logging of the insertion of half of the keys to a new page can be done in one log record.

If rollback is requested, the new pages are discarded and the old page is simply brought back to the tree. This is more efficient than reinserting all the keys deleted from the splitting page.

It is a temporary space-versus-time tradeoff when an extra page is allocated to enable a logging optimization, efficiency in recovery, and support for more concurrency.

The present Concurrent B-Tree system and method do not prevent the option of using nested top actions where part of a transaction persists after a rollback. Nested top actions are typically used with structural modifications. (An example of a nested top action is found in Mohan, et al., "ARIES/IM: An Efficient and High Concurrency Index Management Method Using Write Ahead Logging", IBM Research Report 1989.)

However, if the present Concurrent B-Tree system's structural modifications are rolled back, then the log is used to undo each update automatically and in the exact reverse order to forward processing. The rollback of structural modifications in connection with the present invention preserve the same concurrency and consistency levels as in the forward processing.

With respect to rollback recovery, the present Concurrent B-Tree system and method do not prevent logical undos when needed. An example of a logical undo is the return of a deleted key in forward processing to a different node during undo processing. The synchronization between a simple updating action (insert or delete) and a restructuring action can be done by using a combination of a tree latch and a special flag as in the ARIES/IM system, or by using locks (by the definition given earlier). If logical undos are allowed, then locks cannot be used since deadlocks can occur involving aborting transactions.

The present system presents a semantically consistent method for $B^+$-Tree restructuring. The presented restructuring methods, when used in conjunction with the lock(latch)-coupling technique, can make B-Tree traversal and fetch operations much more efficient where:

There is no wasted I/O in traversing a new empty node as in the $B^{link}$-Tree, The serialization of restructuring is significantly reduced because readers never need to request, hold a tree latch, and retraverse in order to recover from incomplete structural modifications, and Variable size keys are supported.

The present Concurrent B-Tree System supports node splitting and deletion in the forward and rollback processing.

BRIEF DESCRIPTION OF THE DRAWINGS

The invention will be better understood if reference is made to the accompanying drawings in which.

DETAILED DESCRIPTION OF THE PREFERRED EMBODIMENTS

The present invention (the "Concurrent B-Tree System") is directed to a semantically based method for B-Tree restructuring which allows efficient and concurrent traversals and fetches.

The following brief description of database management system (DBMS) concepts pertinent to the present invention will provide the reader with a perspective on the present invention.

The following discussion will refer to the application of the present invention in connection with a DBMS. However, the present system and method are not limited to use in a DBMS systems, per se, but have equal application in an operating system for file management, and the like, as will become apparent to those of skill in the art.

A more detailed description of the concepts discussed in this section is found in a number of references, including "An Introduction to Database Systems", Vols. I and II, by C. J. Date (Addison-Wesley Publishing Company, Inc., 1990).

Figure 1:
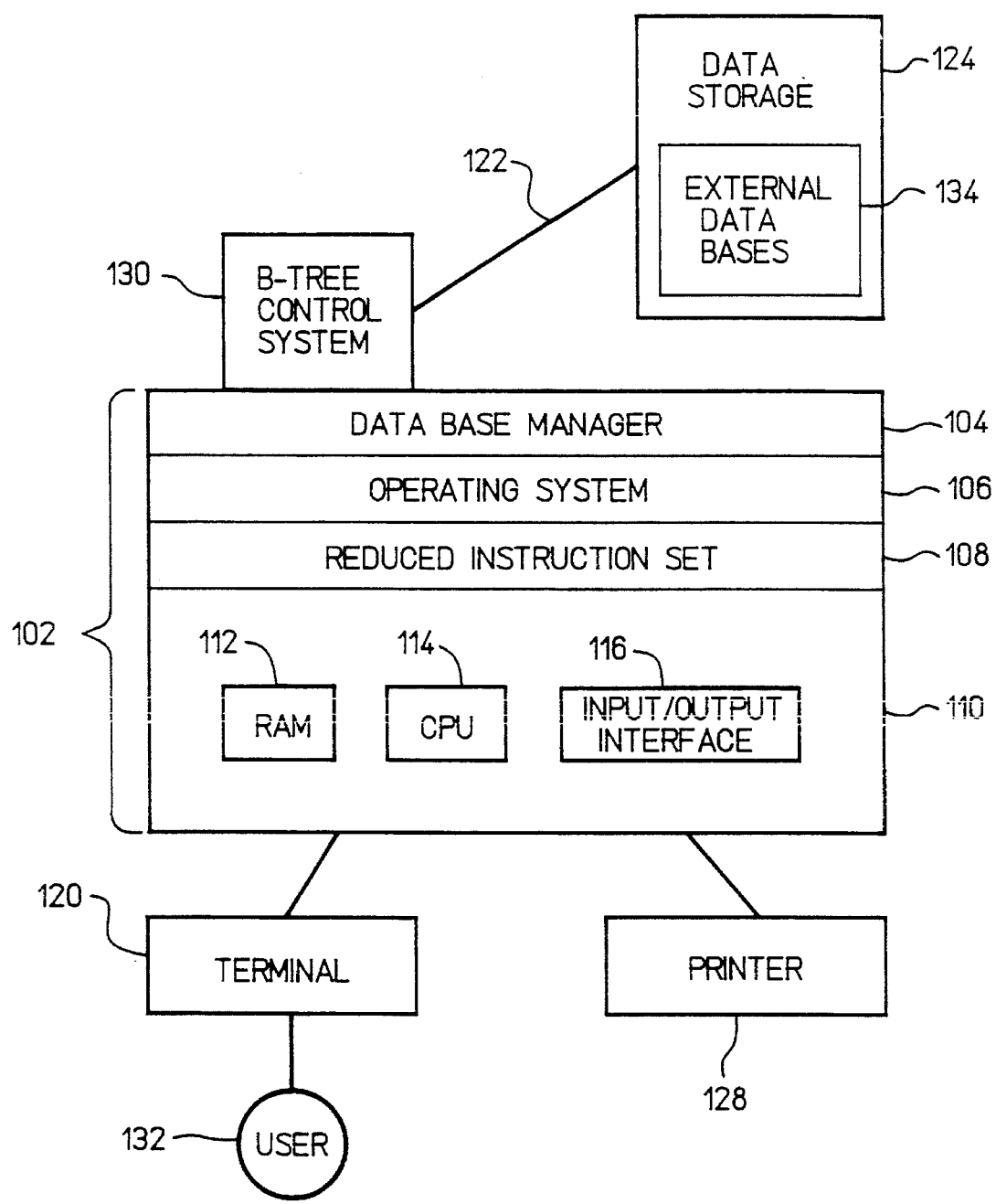
FIG. 1 shows a programming system which can be used to implement the present invention.

An example of hardware implementation of a host computer including a DBMS is shown in FIG. 1. The computer platform 102 includes hardware units 110, including a central processing unit (CPU) 114, a random access memory (RAM) 112, and an input/output interface 116. The RAM 112 is also called a main memory.

The computer platform 102 may include a reduced instruction set (RESC) 108, an operating system 106, and a DBMS 104. The present concurrent B-Tree system and method are depicted as a control system 130 running on the DBMS 104 for management of records on a data storage device 124, for example via link 122. The data storage device 124 is also called a secondary storage and may include hard disks and tape drives. The data storage device 124 represents non-volatile storage. External databases 134 are stored on the secondary storage 124. As discussed above, the present concurrent B-Tree system and method have equal application in an operating system for file management, for example.

Various peripheral components may be connected to the computer platform 102, such as a terminal 120, and a printing device 128. The operating system uses virtual memory and manages all paging. Users 132 interact with the computer platform 102 and the computer program 138 via terminal 120.

In a preferred embodiment of the present invention, the computer platform 102 includes a computer having a Hewlett-Packard HP3000, Series 900 architecture with an MPE/XL operating system or an HP9000, Series 300 or 800 architecture with an HP-UX operating system. The database manager 104 is a Hewlett-Packard ALLBASE, which is a relational database manager.

Concurrent operations of the present Concurrent B-Tree system and method compare favorably with earlier solutions because they avoid wasted I/O. In addition, the present Concurrent B-Tree System considerably reduces the need to repeatedly traverse the tree in order to recover from the effect of in-progress restructuring.

The present Concurrent B-Tree System and method is a variant of the $B^+$-Tree access method. (See R. Comer, "The Ubiquitous B-Tree", ACM Computing Survey, Vol. 11, pp 121–138, 1979.) The present Concurrent B-Tree System and method increases the performance of a high volume database management system. During structural modifications of the B-Tree, a unit of work (or "transaction") wishing to fetch data does not acquire a lock to search (or "traverse") for a pointer to the data record (or "key"). (These type of fetch operations will be referred to as "readers".) As a result, readers do not need to synchronize with structural modifications as in prior art systems. Structural modifications such as node (or page) splitting and node deletion can be carried out by updaters on a node which is concurrently being fetched by a reader.

Moreover, readers traverse the tree from the root to the target node only once to search for a specific key. The same benefit applies to traversals with the purpose of updating. A traversing process never has a need to recover from the effect of an incomplete restructuring operation.

The present Concurrent B-Tree System does not cost a traversal any wasted I/O as in the $B^{link}$-Tree method. Additionally, it supports variable size keys. For the benefits of supporting variable size keys see Keller, et al., "Concurrent Use of B-Trees with Variable Length Entries", ACM SIGMOD Record, Vol. 17, No. 2, June 1988, and Mohan, et al., "ARIES/IM: An Efficient and High Concurrency Index Management Method Using Write Ahead Logging", IBM Research Report 1989.

The present Concurrent B-Tree System and method consists of the combination of a semantically consistent schedule of operations for $B^+$-Tree restructuring and the lock coupling technique for concurrent traversals. However, unlike the present invention, the $B^+$ and $B^{link}$-Trees do not permit nesting of restructuring operations. A node splitting or deletion restructuring operation of the present invention can be initiated prior to the completion of an in-progress node splitting or deletion restructuring operation. Although, node splitting does not occur during node deletion, and vice versa. Because of the ordering of the restructuring steps performed by the present system and method, there is no conceptual limit to the number of nested restructuring operations permitted the present invention.

The present Concurrent B-Tree System and method utilize nodes, where a node is the unit of I/O and all nodes have the same size. Each node, including the root, contains a variable number m of variable size keys where each key corresponds to a data record or a child node. Keys in a node range from K to K+m where value(K+m)>value(K+m−1)>value(K+m−2) . . . . Key values increase from the root to the leaf nodes.

A key is a {value,link} pair. In leaf nodes, a value corresponds to one field: or a combination of fields, from the data record. In non-leaf nodes, a value corresponds to the highest value in the corresponding child. The highest value in a non-leaf node is given a maximum value "MAX" which is greater than any possible key value in the B-Tree.

In leaf nodes, the link corresponds to the address of a data record, while in the non-leaves, the link corresponds to the address of a child node.

Figure 2:
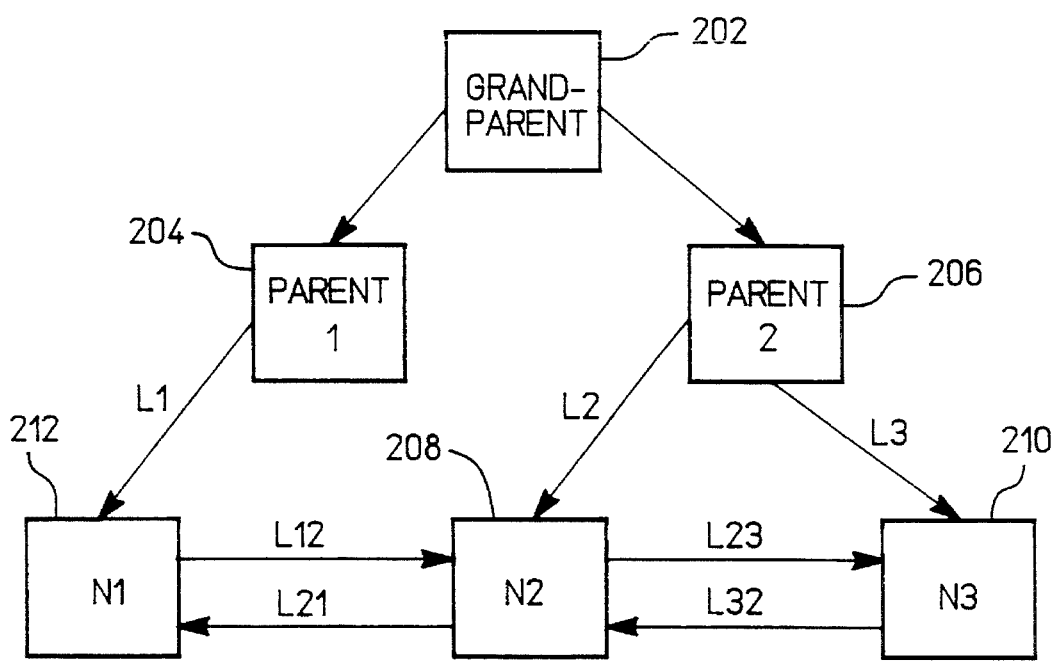
FIG. 2 shows a B-Tree structure in connection with the present invention.

FIG. 2 illustrates a cross-section of a B-Tree in connection with the present invention. The root node 202 labeled "Grandparent" has two child nodes. The two child nodes are "Parent 1" and "Parent 2", which are numbered 204 and 206, respectively. The leaf nodes N2 and N3 (numbered 208 and 210, respectively) have the same parent node 206. Leaf node N1 (labeled 212) and leaf node N2 have different parent nodes Parent 1and Parent 2, respectively.

Leaf nodes are doubly linked to allow range scans in ascending and descending order. Non-leaf nodes are not doubly linked. At the leaf node level, N1 and N2 are doubly linked by a first link from N1 to N2, labeled L12, and a second link linking N2 to N1, labeled L21. Leaf nodes N2 and N3 are similarly doubly linked.

If a range of keys is searched, then a starting key is located by traversing the tree from root to leaf. The leaf nodes are then traversed sequentially until the stopping (or target) key is reached.

Some of the commonly known SQL operations supported by the present system and method are fetch first, fetch next, inserts and deletes. All operations start by a traversal from the root to the target leaf. The value returned is the position of the located key, or in the case of an insert, the returned value is the new position for the key to be inserted in the leaf.

The following functions are used to designate specific bytes in the present Concurrent B-Tree System and method:

| | | |
|---|---|---|
| • | value(key) | returns the value part of the specified key, |
| • | link(key) | returns the link part of the specified key, |
| • | parentkey(value) | returns the key in the parent corresponding to the specified node, and |
| • | highest(node) | returns the highest key value in the specified node. |

Unlike locks, latches are not mentioned as often in the literature. The starting point for a definition of latches can be found in Mohan, et al., "ARIES/IM: An Efficient and High Concurrency Index Management Method Using Write Ahead Logging", IBM Research Report 1989.

Locks are used to assure the logical consistency of data, while latches are used to synchronize access to memory structures and to assure the physical consistency of data and shared control blocks. There is no deadlock detection on latches, making latches cheaper to use.

When a node (page) is brought into memory, a buffer control block is automatically associated with the node. The control block contains information about the state of the buffer. Among others, a node can be in S (Share) mode or X (exclusive) mode. If the node is held as either S or X, then it is equivalent to a held latch. This type of latch will be referred to as a page latch. In addition, a time stamp is associated with the page This is referred to as "logging" and will be discussed in further detail below.

In the present system and method, latches are assigned levels to avoid undetected deadlocks (a deadlock occurs when two or more transactions are simultaneously held in a wait state, each waiting for one of the others to release a lock before it can proceed). Once a latch is held, the protocol allows the request of other latches at higher levels, but not at an equivalent or a lower level.

Latches are held for a short time, such as the duration of a single page update. Contrastingly, locks are held across several logically related updates. The present system uses a type of lock-coupling technique. However, latches are used instead of locks. The technique will therefore be referred to as latch-coupling.

In the present latch-coupling technique, an S latch is held on a parent node (page) until a child is latched (in S or X). This is to guarantee that a pointer is not updated in the parent, before access of a valid child is permitted. Therefore, two page latches are held at a time. Page latches are all classified at the same latch level.

Given the above described latch protocol, supplemental rules will now be explained. These added rules permit more than one page latch to be held at the same time without potentially causing an undetected deadlock. It is desired to avoid a deadlock involving both locks and latches. The additional rules are as follows:

1. A process can request and simultaneously hold several page latches in the S mode. The corresponding nodes can be at the same level in the B-Tree or at different heights.
2. A process can request a page latch in the X mode only if the other acquired and held page latches are on higher nodes and in the S mode (i.e., an X latch on a child can be requested while holding an S latch on the parent). Once an X latch on a child is held, no more page latches will be issued until the currently held X latch is released. An X latch request on a node is not allowed if another latch is held on a sibling or a child. By the same token, an X latch can be requested on a node while holding an S latch only if the S latch is on the parent.
3. A process can hold a lock and request a latch; however, a process cannot hold a latch and request a lock unconditionally. In this instance, the process must wait to be issued a lock.

When executed concurrently with the structural modifications, the present system and method rely on the efficiency of using latches instead of locks during traversals, fetch first and fetch next operations.

A B-Tree node is the unit of I/O in the present Concurrent B-Tree system and method. A node is called a page when it is buffered into RAM memory. Therefore, the terms "node" and "page" will be used interchangeably.

Using the definition in Shasha, et al., "A sequence of instructions I is guaranteed to be atomic in a process E if no instruction outside I (in E or in a different process P') can modify any data accessed by any instruction in I while executes. An atomic operation is an operation than the algorithm guarantees to be atomic. A typical atomic operation is a sequence of instructions that accesses a node to determine where to go next." A single update such as adding a key, removing a key, or updating a link on a single page is an atomic operation.

In the Write Ahead Logging (WAL) system, a page is latched exclusive during an update where the log is written first and the page is updated second. The update operation is atomic, because a reader is not allowed to read until the update is complete. Therefore, the results of an atomic operation are indivisible and recoverable. The reader waits for the update to complete in order to get the page latch in share mode.

The notion of atomic operations as used in the present restructuring system is common to other B-Tree systems.

The present system uses the transaction concept as set forth in J. Gray's "Notes on-Data Base Operating Systems", Lecture Notes in Computer Science, Volume 60, Springer-Verlag, 1978. The following characteristics of a transaction are discussed for the purpose of simplification. A transaction is a collection of logically related database access operations. Those familiar with the WAL system understand that a log record is automatically generated for each database update. Every node update is therefore part of a transaction. To rollback for example, the log records for the transaction are undone in the exact reverse order as in the log. The present system method provide the same concurrency and consistency during such a transaction rollback.

The following is a description of a Semantically Consistent Schedule. The arguments presented in Shasha, et al. have been adopted in order to verify the correctness of the present Concurrent B-Tree system and method.

All search structure states with the same keys represent the same dictionary state. Therefore, after a specific operation, if the state of the tree is equivalent to the state of the tree before the operation, then the operation is a "semantically consistent schedule". With a semantically consistent schedule, two processes may follow different paths to, for example, traverse the B-Tree. However, the result returned is the same.

The present Concurrent B-Tree system uses the Write Ahead Log Protocol (WAL) approach to recovery. For background, a through discussion of database management systems and environments, including WAL recovery techniques, can be found in C. J. Date's textbooks titled, "An Introduction to Database Systems", Vols I and II, (Addison-Wessley Pub. Co., 1990).

In a WAL system, the undo portion of the log must be on non-volatile storage before the new copy of the data is written over the old data in the stable storage. To undo, or rollback a transaction, the present Concurrent B-Tree system starts at the last log record written by the transaction manager, and undoes logged transactions in reverse chronological order until the first log record is undone.

Furthermore, a page version is incremented every time the page is updated. The old page version and the new page version are recorded in the log every time the page is updated. If a system failure occurs, then log records are rolled back or reexecuted depending on the value of a page version. Atomic updates on a single page consist of getting an X latch on a page, writing the log, updating the page, and then releasing the page latch. During recovery, a page update is also atomic.

The following is a definition for B-Tree "Structural Modifications" (SM's). A node split is a tree SM. When a node becomes full, it splits and is replaced by two new nodes. A node can be a parent (non-leaf) node with child nodes or a leaf node with data records rather than child nodes. Similarly, if a node is empty, then it is deleted from the tree. This is also a tree SM.

A one-key insert into a leaf node is not a structural modification. The same goes for a one-key delete from a leaf node. Given that the physical consistency of a single node update is maintained by node latching, then when a node is updated, it is latched exclusive. When a node is read, it is latched shared.

An SM operation can be divided into suboperations where each operation is guaranteed to be atomic. Readers or other updaters are not allowed to access a node during an atomic operation. (See Date for a discussion of atomicity.) As noted above, the sequence of steps during a rollback is followed in the exact reverse order.

Figure 3A:
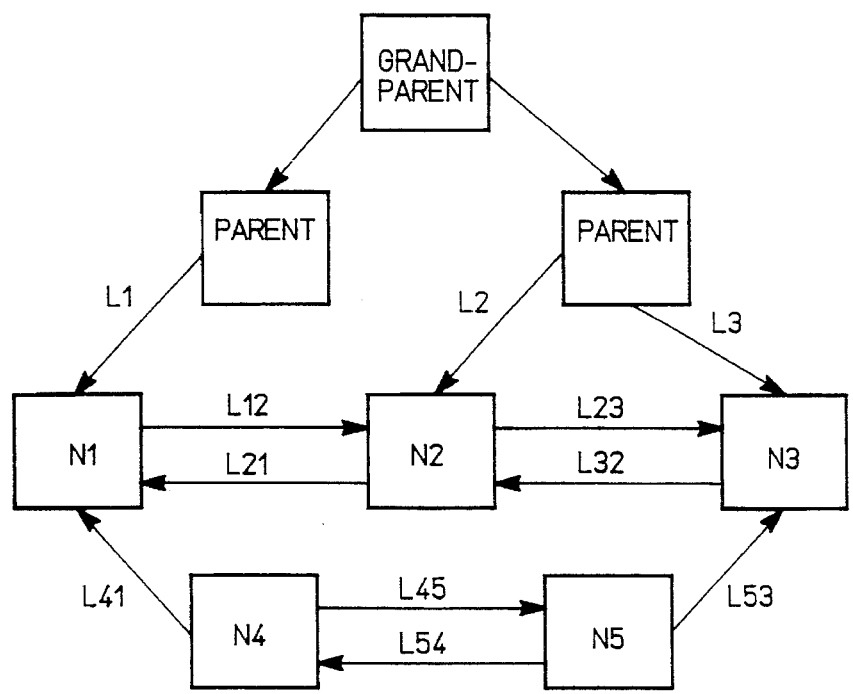
FIGS. 3A,3B,4A,4B,5A,5B show Steps involving in B-Tree node splitting in connection with the present invention.
Figure 7:
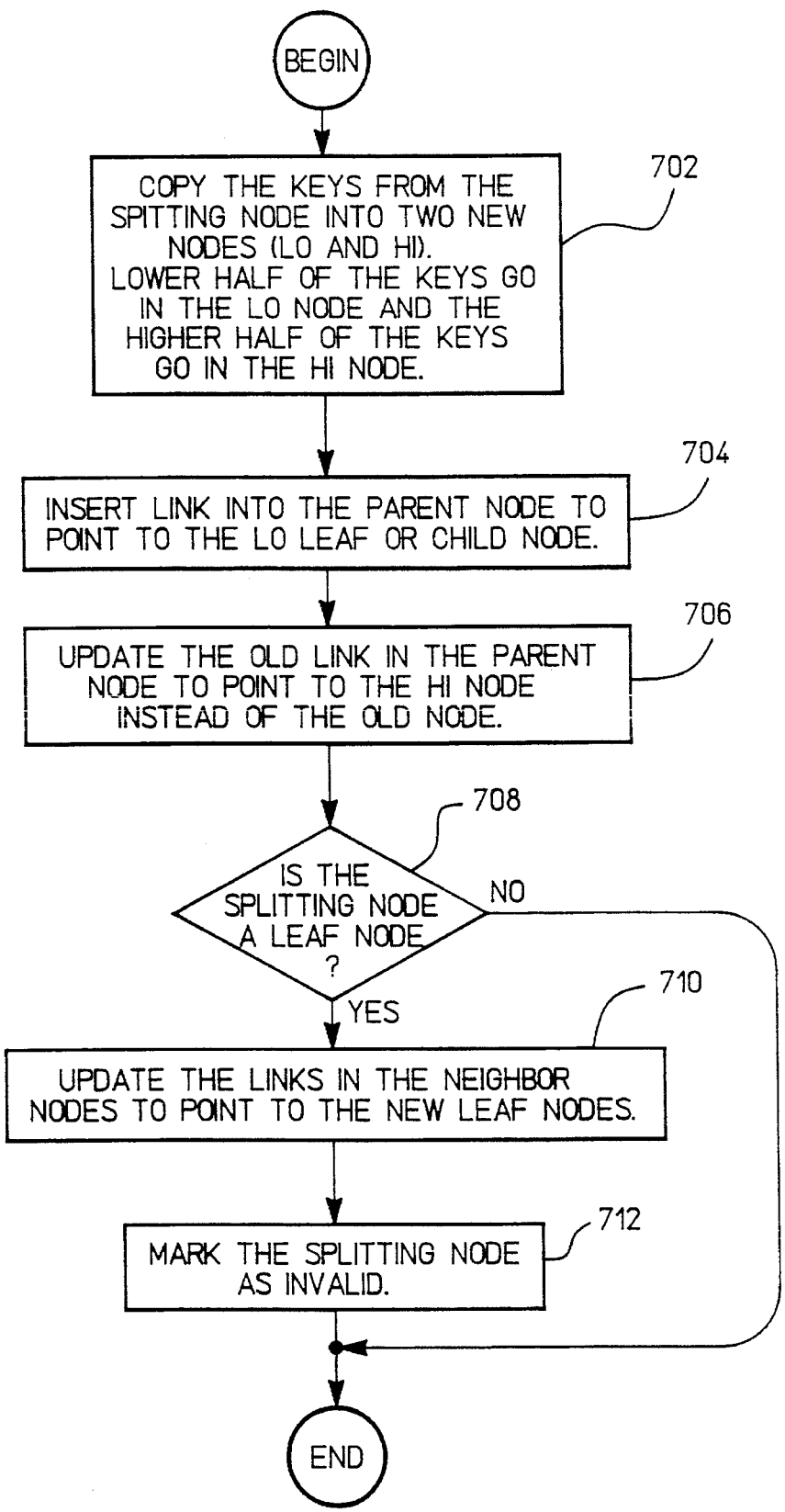
FIG. 7 is a flow chart showing node splitting in connection with the present invention.

FIGS. 3–5 show the steps of a node splitting SM. FIG. 7 is a flowchart which represents the process flow for node splitting. The steps taken are as follows:

1. First, two new nodes N4 and N5 are generated as shown in FIG. 3A. The keys from splitting node N2 are loaded into the new nodes N4 and N5. These two new nodes may be leaf nodes or child nodes, depending on the status of the splitting node. (In this example they are leaf nodes.) Node N4 contains the lower value keys K through K+m/2. N4 is also referred to as the LO node. N5 contains the higher value keys K+(m/2)+1 through K+m. N5 is referred to as the HI node.

Each leaf node contains links to the previous node and the next node. Therefore, the links on node N4 are established: link L45 connecting node N4 to node N5, and L41 linking N4 to N1. On node N5, links L54, which links node N5 to node N4, and L53, which links N5 to node N3, are established. Step 1 is now complete and is shown at 702 of FIG. 7. Note that the B-Tree is not touched in FIG. 3A. All the updates are on the new nodes which are not yet plugged into the tree.

Figure 3B:
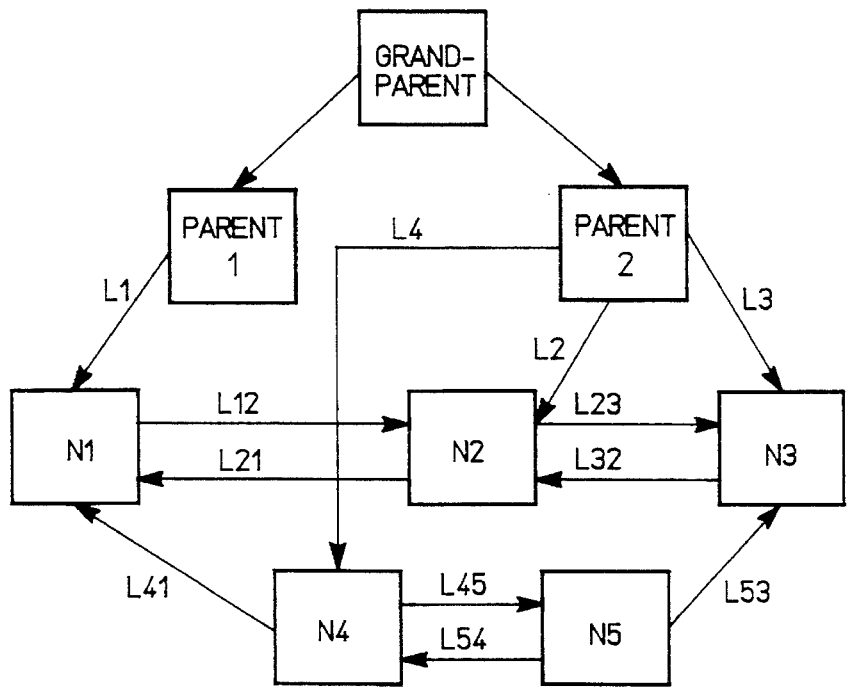

2. Insert a new key L4 in the parent node of N2, to correspond to the new LO node N4. Step 2 is shown at 704 and FIG. 3B illustrates the tree state after its completion.

Figure 4A:
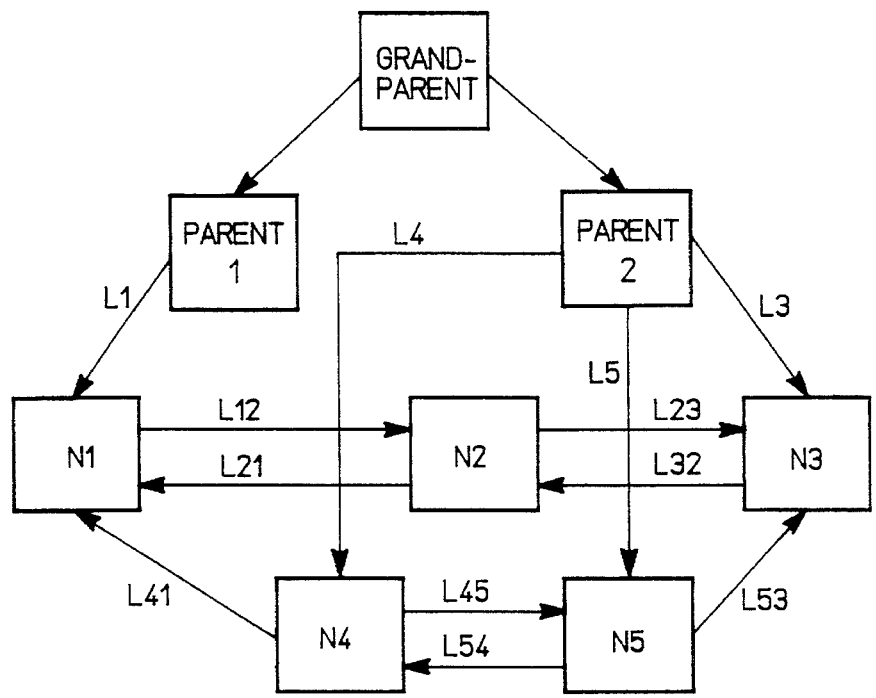

3. The key corresponding to the splitting node N2 must be further updated in the parent. A new key L5, a link to the new HI node N5, is therefore added to completely replace the link to N2. Step 2 is shown at 706 and FIG. 4A illustrates the tree state after its completion.

Figure 4B:
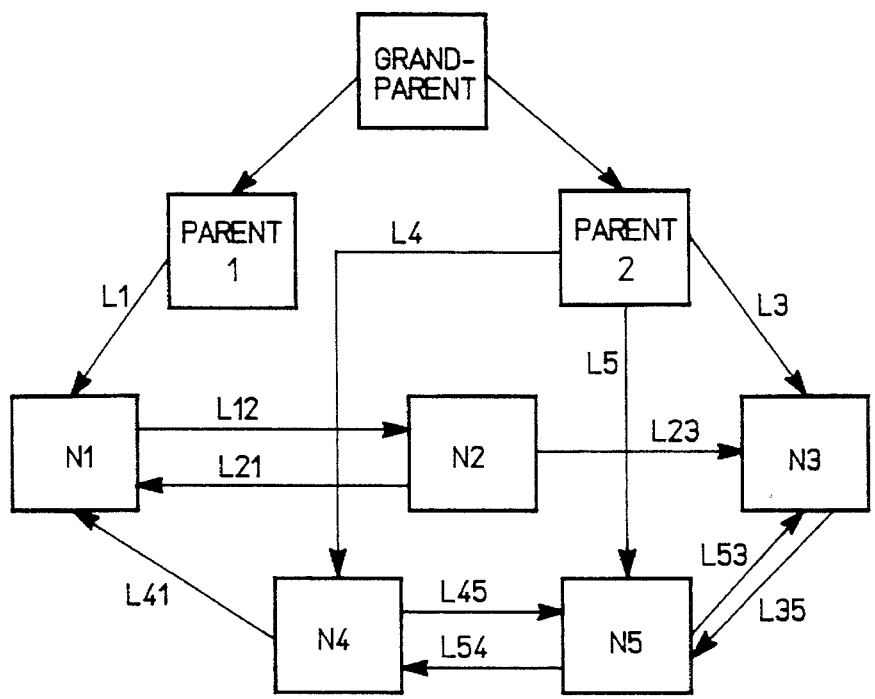

4. Next, if it is a leaf node, the link of the neighbor leaf of the LO node is updated to point to the LO node N4. L12 is now replaced by L14. FIG. 4B illustrates the tree state after the completion of Step 4.

Figure 5A:
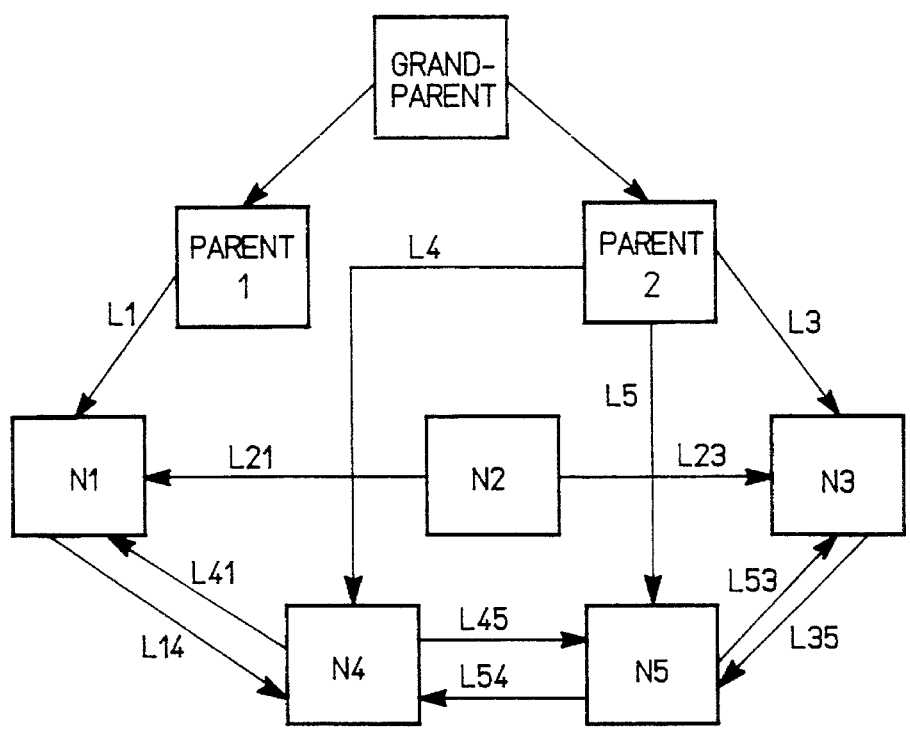

5. Again, if it is a leaf node, the link of the neighbor leaf of the HI node is updated to point to the HI node N5. L32 is now replaced by L35. The same must be done for link L32. FIG. 5A illustrates the tree state after the completion of Step 5. Referring again to FIG. 7, The leaf node condition is checked at 708 for Steps 4 and 5 and the updates are shown at 710.

Figure 5B:
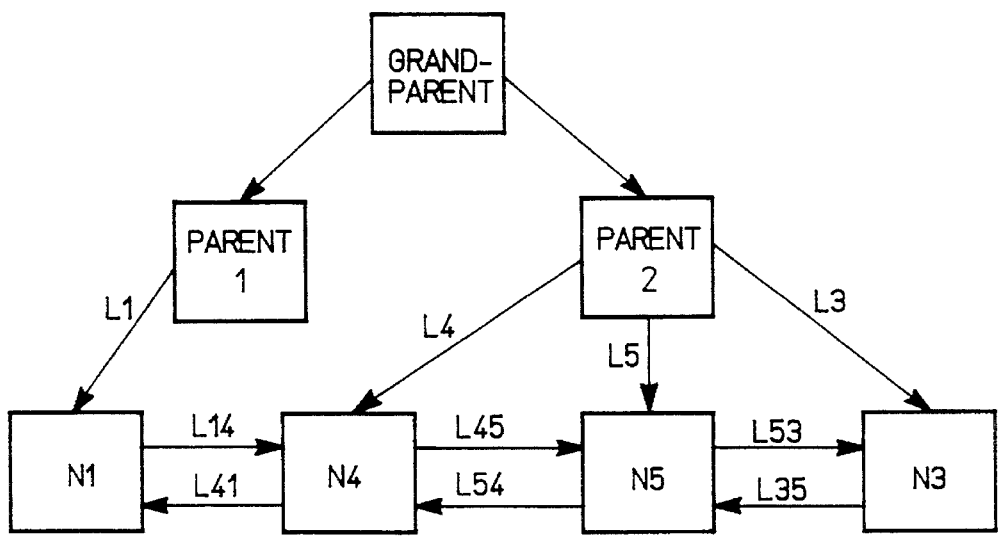

6. The splitting node N2 is now freed by marking it as invalid (see 712). FIG. 5B illustrates the tree state after the completion of Step 6.

It will become apparent to those of skill in the art, working in concurrency control and search structures, that the above node-splitting procedure is easily adaptable to cover non-leaf node splitting.

The ordering of Steps 1–3 is necessary to permit concurrent reading during node-splitting. However, in the case of a leaf node, the ordering of Steps 4 and 5 is insignificant.

Figure 6C:
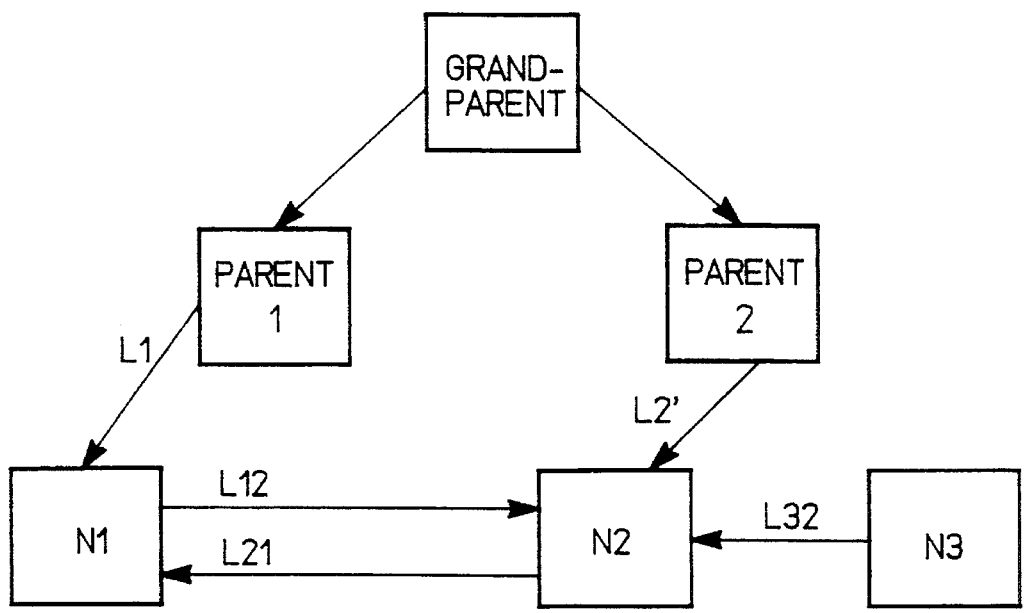
FIGS. 6A,6B,6C show Steps involving B-Tree node deletion in connection with the present invention.
Figure 6A:
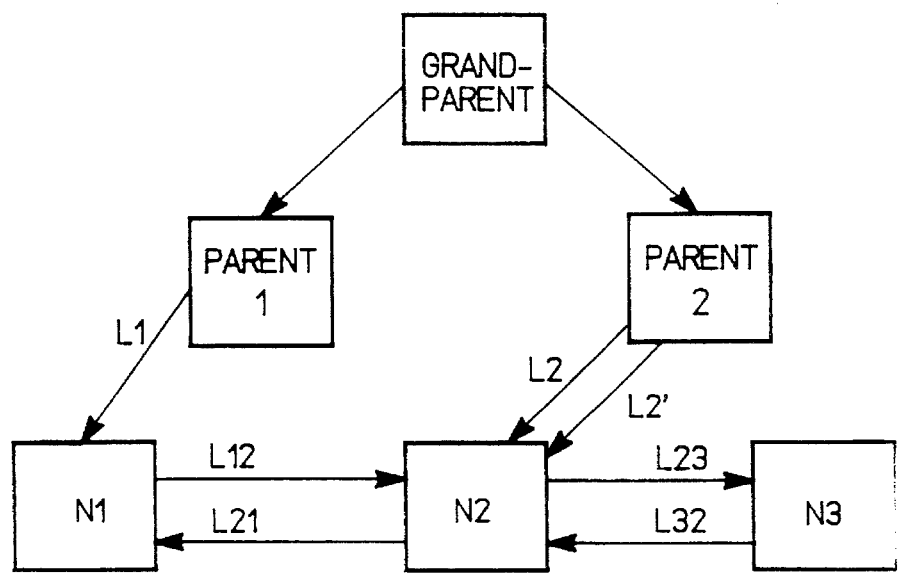
Figure 6B:
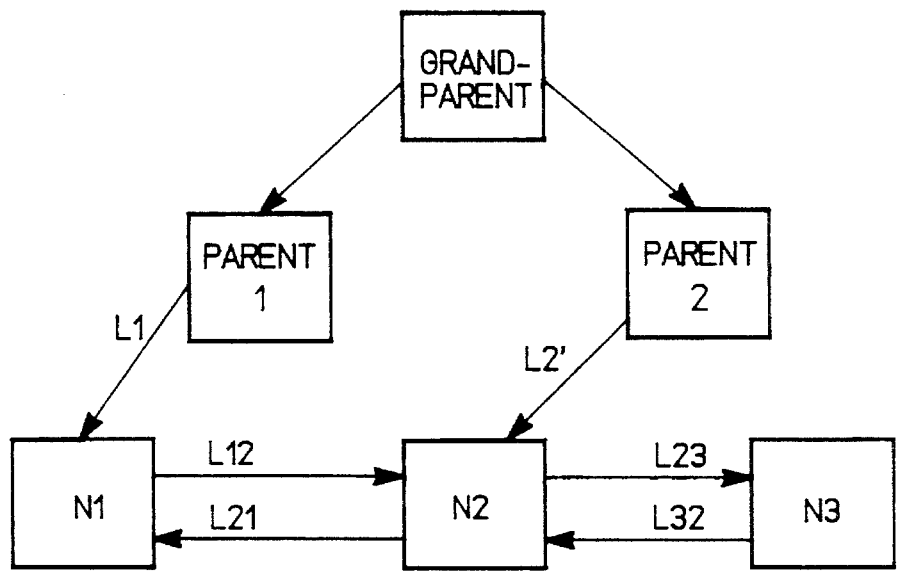
Figure 8:
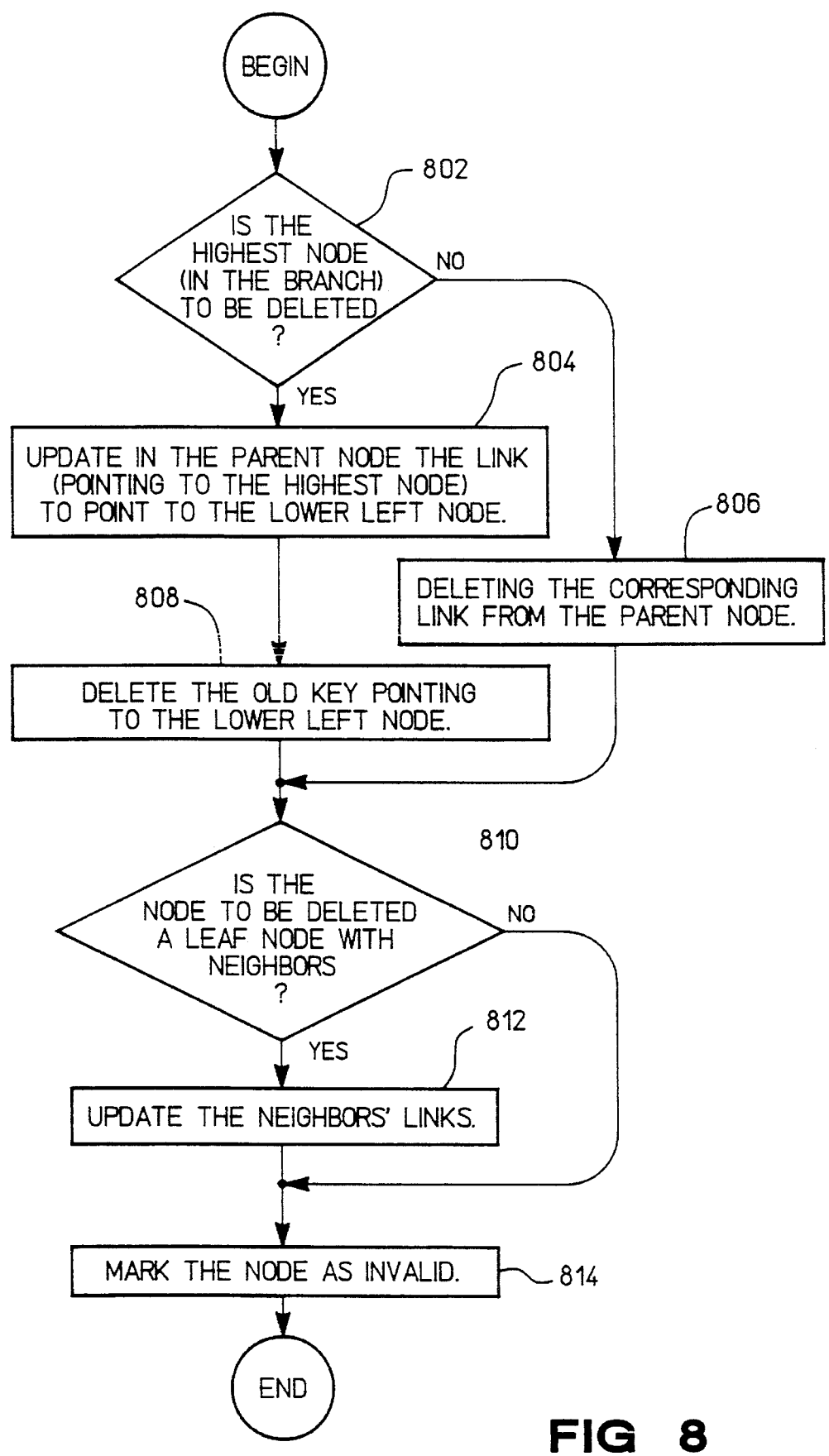
FIG. 8 is a flow chart showing node deletion in connection with the present invention.

FIGS. 6A–C show the steps involved in a Node Deletion. FIG. 8 is a flowchart which represents the process flow for node deletion. Following are the sequence of steps for the deletion of N3:

1. If the node to delete is the highest value node of a parent: then, in the parent, make the corresponding key point to the left (lower) neighbor; else, delete the key pointing to the node to delete. FIG. 6A illustrates the conversion of link L3 to L2', because N3 is the highest node. (If N2 was the node to delete, the "else" would apply, and L2 would merely be deleted.) The determination of whether the node to be deleted is the highest node is shown at 802 of FIG. 8. The parent node update is shown at numeral 804 and the "else" condition, which corresponds to the deletion of the link from the parent node, is shown at numeral 806.

2. If the node to delete is the highest value node: then, in the parent, delete the key corresponding to the left (lower) neighbor. FIG. 6B illustrates the deletion of link L2, and the tree state after the completion of Step 2. (If N2 was the node to delete, link L3 would still point to the highest value key, and Step 2 would not be necessary.) The deletion of the key pointing to the lower left node is shown at numeral 808.

2. If it is a leaf node: update the link of the left neighbor, if any. Consider the deletion of node N3; link L23 is now deleted. FIG. 6C illustrates the tree state after the completion of Step 3. (If N2 was the node to delete, link L23 would be replaced by a new link L13.)

4. If it is a leaf node: update the link of the right neighbor if any. Consider the deletion of node N2; link L32 is now replaced by L31. The leaf node condition is checked at 810 and the update of the neighbor's links is shown at 812. The node is marked invalid as shown at 814.

The ordering of Steps 1 and 2 is necessary to permit concurrent reading during the node deletion. However, in the case of a leaf node, the ordering of Steps 3 and 4 is insignificant.

The following includes an informal proof of correctness. Also evaluated is the consistency found by traversal and fetch operations when they concurrently access nodes involved in in-progress structural modifications using the methods described in the previous sections.

Latching, as defined above, is used during traversals in the present Concurrent B-Tree system.

It is necessary to ensure that the next node in a traversal path is latched before the latch on the previous node is released. Given that a node is never invalidated until all links to it are removed, the present system's traversal technique ensures that the next node accessed is valid and correct. Otherwise, a "give-up" technique may be necessary to relocate.

Whenever a node is accessed using a give-up technique, the range of keys is checked to ensure that it is the correct node. The present system's restructuring methods ensure that a give-up scheme is not needed when the latch-coupling technique is used in the traversal. (See Shasha, et al.'s "Concurrent Search Structure Algorithms" ACM Transactions on Database Systems, Vol. 13, No. 1, March 1988, for further discussion of give-up techniques.)

A B-Tree traversal for the purpose of fetching or updating can follow one of the following directions:

From root to leaf, never in the reverse direction,

From leaf to leaf ascending (descending), and

From leaf to leaf ascending (descending), then modify the scan direction to descending (ascending).

A scan can resume or change direction at a node. The node is relatched share every time the scan is resumed. A node timestamp is checked against the previous timestamp noted when the node was last read. The process continues if it is the same. Otherwise, the search must relocate starting at the root node.

A B-Tree is consistent if a search in any of the above directions finds the following:

All keys corresponding to committed data records are found,

Every existing key is found once and only once, and

All keys are found in the correct sorted order.

Note that for insert and delete functions, the above definition of consistency does not apply.

Additional concurrency control is required, however, to prevent a structural modifications on a node which is currently under structural modification. As in the ARIES/IM system, the combination of a tree latch and a special SM bit to detect in-progress restructuring may be employed. Locks may also be used.

Verification of Node Splitting—Step 1. Prepare 2 new nodes. Set up all the links on the new node. See FIG. 3A. Consider N2 as the splitting node. The B-Tree is not modified at all at this point. After this Step 1 is completed, the B-Tree is intact and consistent during a concurrent traversal from root to leaf. A concurrent traversal from leaf to leaf in ascending order finds an intact and consistent B-Tree. Further, a concurrent traversal from leaf to leaf in descending order finds an intact and consistent B-Tree.

Node Splitting—Step 2. Insert a new key in the parent node for the LO node N4. The insertion is atomic. Parentkey (N4)<parentkey (N2) . FIG. 3B shows the subtree after the completion of Step 2.

Consider a search from root to leaf for a key k, the value(k)≦highest(LO). The highest(LO) is the value(K+(m/2)). Once the parent is reached, then the new link(K+(m/2)) is followed. The search for a key will stop at the leaf by finding the key k or the position where to insert it in the LO node N4. If value(k) is greater than value(K+(m/2)), then the old link(K+m) (the same as link (highest(N2))) is followed leading to the splitting node N2 still containing keys K through K+m.

For a scan on a range of keys, the tree must be traversed sequentially from leaf to leaf. Given the search started above, once the leaf node is identified, it is latched Share, thus preventing any update process from updating any keys or freeing the node until the search through the current node is complete.

Now consider the case where a search lands on the original splitting node. The node is valid, contains correct pointers to the tree or to data, and contains all keys K through K+m. The tree is consistent to the scan from leaf to leaf, ascending or descending. Next, consider the case where we landed on the new LO node. The node contains a correct pointer to a sibling in the tree on the left-hand side to allow us to continue in descending order. The node also contains a correct pointer to its sibling: the HI node N5. Node N5 also contains a correct sibling link.

An ascending scan starting from the LO node N4 follows the order N4, N5, N3. A descending scan starting from the LO node N4 follows the order N4, N1. An ascending scan starting from the N2 node follows the order N2, N3. A descending scan starting from the N2 node follows the order N2, N1.

Consider a change in scan direction when the scan is positioned on the LO node N4. The scan can proceed in the same way a scan in the reverse direction will proceed.

Finally, consider a modified scan direction issued after the scan steps off nodes N1 or N2. An ascending scan coming through N1 follows the order N1, N2, N3. A descending scan coming through N3 follows the order N3, N2, N1.

Node Splitting—Step 3. On the parent node, the key corresponding to the splitting node must be updated. Only the link part of the key is updated. The update is atomic. Therefore, the Highest_value(N2) (read the highest value key of node N2) is set equal to the Highest_value(N5). L2 is replaced by L5. FIG. 4A illustrates the state of the tree after the completion of Step 3.

A search from the root to the leaf for a key between the values of K and K+m will land on the LO node N4 if value<k)≤value(K+(m/2)) or will land on the HI node N5 if value(k)>value(K+m). The LO node N4 and the HI node N5 contain the correct pointers to all siblings in the tree, and to each other. An ascending scan starting from the LO node N4 follows the order N4, N5, N3. A descending scan starting from the LO node N4 follows the order N4, N1. An ascending scan starting from the HI node N5 follows the order N5, N3. A descending scan starting from the HI node N4 follows the order N4, N1.

Consider a change in scan direction when the scan is positioned on the LO node N4. The scan can proceed in the same way a scan in the reverse direction will proceed.

Now consider a modify scan direction issued after the scan steps off nodes N4 or N5. The neighbor leaf nodes are still linked to the old node N2. An ascending scan coming through N1 follows the order N1, N2, N3. A descending scan coming through N3 follows the order N3, N2, N1.

Node Splitting—Step 4. Update the link of N1, the left neighbor leaf of the LO node N4, to point to N4 instead of N2. FIG. 4B illustrates the state of the tree after the completion of Step 4.

A search from the root to the leaf for a key between the values of K and K+m will land on the LO node N4 if value(k≤value(K+(m/2)), or will land on the HI node N5 if key>K+m. The LO node N4 and the HI node N5 contain the correct pointers to the tree, and to each other.

The link from the tree to the new LO node N4 is now set. An ascending scan starting from the LO node N4 is now set. A descending scan starting from the LO node N4 follows the order N4, N5, N3. An ascending scan starting from the HI node N5 follows the order N5, N3. A descending scan starting from the HI node N4 follows the order N4, N1.

Consider a change in scan direction when the scan is positioned on the LO node N4. The scan can proceed in the same way a scan in the reverse direction will proceed.

Also, consider a modified scan direction issued after the scan steps off node N4 or N5. The node N1 points to N4 but N3 points to N2. An ascending scan coming through N1 follows the order N1, N4, N5, N3. A descending scan coming through N3 follows the order N3, N2, N1.

Note that the scan in the ascending order will follow a different path in the reverse direction. However, the keys scanned are exactly alike.

Node Splitting—Step 5. Update the link of N3, the right neighbor leaf of the HI node N5, to point to N5 instead of N2. FIG. 5A illustrates the state of the tree after the completion of Step 5.

A search from the root to the leaf for a key between the values of K and K+m will land on the LO node N4 if k≤K+m/2 or will land on the HI node N5 if k>K+m. The LO node N4 and the HI node N5 contain the correct pointers to the tree and to each other.

The links from the tree to the new nodes N4 and N5 are now set. The split is almost complete except that some scans may still be positioned on the old node N2. An ascending scan continuing from N2 follows the order N2, N3. A descending scan continuing from N2 follows the order N2, N1. An ascending scan starting from the LO node N4 follows the order N4, N5, N3. A descending scan starting from the LO node N4 follows the order N4, N1. An ascending scan starting from the HI node N5 follows the order N5, N3. A descending scan starting from the HI node N4 follows the order N4, N1.

Consider a change in scan direction when the scan is positioned on the LO node N4. The scan can proceed in the same way a scan in the reverse direction will proceed.

Now consider a modify scan direction issued after the scan steps off nodes N4 or N5. The node N1 points to N4, N4 points to N5, and N5 points to N3. An ascending scan coming through N1 follows the order N1, N4, N5, N3. A descending scan coming through N3 follows the order N3, N2, N1.

Node Splitting—Step 6. Free the splitting node. This step cannot be completed until every scan steps off the splitting node. The node is then timestamped. If a scan needs to resume from this node, it first checks the timestamp. Therefore, a scan cannot resume from the splitting node after it is freed. Additionally, no scan can step onto the splitting node at this time since there are absolutely no links (pointers) to it from the tree.

The following is a verification of the Node Deletion—Step 1. If the node to delete is the highest value node then make the corresponding key MAX point to the neighbor in the parent. Consider the deletion of node N3 shown in FIG. 6A. Note that there is only one neighbor in this case, the lower (left side) one. For other nodes, this step is skipped.

A traversal from root to leaf will be directed from the parent through either the neighbor key link L2 or the MAX key's link L2'. Both now point to the neighbor N2. An ascending scan continuing from N1 follows the order N1, N2, N3. A descending scan continuing from N3 follows the order N3, N2, N1.

Node Deletion—Step 2. Delete the corresponding key in the parent. If the node to delete is the highest value node such as N3, then, instead, delete the original neighbor's key in the parent, such as L2. FIG. 6B illustrates the state of the subtree after the completion of this step. A traversal from root to leaf will never follow N3 because there is no link from the parent (Parent 2) to N3.

An ascending scan continuing from N1 can still read N3 which is empty, because N2 still points to it, since it is an extra I/O. However, the keys retrieved are correct.

A resuming scan at node N3 will find that the timestamp on N3 has changed. It will reseek from the root. An ascending scan continuing from N1 will follow the order N1, N2, N3.

Node Deletion—Step 3. For leaf nodes, the link of the left neighbor, if any, is updated. Consider the deletion of node N3. L23 is now replaced by a NIL link. FIG. 6C illustrates the state of the subtree after the completion of this step.

A traversal from root to leaf will never land on N3 since there is no longer a link from the parent to N3.

An ascending scan will follow the order N1, N2. A descending scan from N2 is not affected by any step in the SM. A resuming scan at N3 will find that the timestamp on N3 was updated and will reseek from the root.

Node Deletion—Step 4. For leaf nodes, the link of the right neighbor, if any, is updated. For node N3, there is no right neighbor. If there was one, we could make the same argument for the consistency found by concurrent scans as for the previous step.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim:

1. A method for a B-Tree restructuring on a computer system for managing data during a node splitting operation, said system permitting concurrent reading of the B-Tree during the node splitting, wherein the splitting node has a parent node and includes a variable number of variable size keys where each key corresponds to one of a data record and a child node and where the keys include lower value keys and higher value keys, the method comprising the steps of:

(1) generating the following:
   first and second child nodes if the splitting node is a parent node;
   first and second leaf or child nodes if the splitting node is a leaf node, wherein each leaf node includes a previous link pointing to a previous node and a next link pointing a next node, said next link of said first leaf node points to said second leaf node and said previous link of said second leaf node points to said first leaf node;

(2) copying the lower value keys from the splitting node into said first leaf or child node, wherein the first leaf or child node becomes a LO node; and copying the higher value keys from the splitting node into the second leaf or child node, wherein the second leaf or child node becomes a HI node;

(3) inserting a first key into the parent node, wherein said first key point to said first leaf or child node;

(4) updating a second key in the parent node, wherein said second key points to said second leaf or child node, wherein said updating of said second key only updates a link part of said second key;

steps (1) through (4) being performed in the order given, with the two steps recited within step (2) being performed in either order;

(5) if the splitting node is a leaf node:
   updating node links from at least one of said previous node and said next node to point to said first and second leaf nodes, respectively; and (6) marking the splitting node as invalid; step (6) being performed last.

2. A method according to claim 1, further comprising the step of:

permitting nested B-Tree restructuring for managing data during at least one of a further node splitting operation and a node deletion operation, wherein said further node splitting operation and said node deletion operation occur during the node splitting operation and node deletion, respectively, said system permitting concurrent reading of the B-Tree during said nested restructuring, wherein said node splitting operation and said node deletion operation cannot occur on the same node at the same time.

3. A computer system for managing data and B-Tree restructuring during a node splitting operation, said system permitting concurrent reading of the B-Tree during the node splitting, wherein the splitting node has a parent node, and includes a variable number of variable size keys where each key corresponds to one of a data record and a child node and where the keys include lower values keys and higher value keys, the system comprising:

(a) means for generating the following;
   first and second child nodes if the splitting node is a parent node;
   first and second leaf or child nodes if the splitting node is a leaf node, wherein each leaf node includes a previous link pointing to previous node and a next link pointing to a next node, said next link of said first leaf node points to said second leaf node and said previous link of said second leaf node points to said first leaf node;

(b) means for copying the lower value keys from the spitting node into said first leaf or child node, wherein the first leaf or child node becomes a LO node; and for copying the higher value keys from the splitting node into the second leaf or child node, wherein the second leaf or child node becomes a HI node and each leaf or child node thereby contains at least one link to at least one of a previous node and a next node;

(c) means for inserting a first key into the parent node, wherein said first key points to said first leaf or child node;

(d) means for updating a second key in the parent node, wherein said second key points to said second leaf or child node, wherein said means for updating said second key only updates a link part of said second keys items (a) through (d) being operated in the order presented, with the two operations recited for item (b) being executed in either order;

(e) means for updating node links from at least one of said previous node and said next node to point to said first and second leaf nodes, respectively, when the splitting node is a leaf node; and (f) means for marking the splitting node as invalid; item (f) being operated last.

4. A system according to claim 3, wherein the B-Tree restructuring is performed by a database manager.

5. A system according to claim 3, wherein the B-Tree restructuring is performed by an operating system.

6. A system according to claim 3, further comprising:

means for permitting nested B-Tree restructuring for managing data during at least one of a further node splitting operation and a node deletion operation, wherein said further node splitting operation and said node deletion operation occur during the node splitting operation and node deletion, respectively, said system permitting concurrent reading of the B-Tree during said nested restructuring wherein said node splitting operation and said node deletion operation cannot occur on the same node at the same time.

* * * * *